(12) United States Patent
Farkas et al.

(10) Patent No.: US 9,349,399 B2
(45) Date of Patent: May 24, 2016

(54) PREVENTING DAMAGE TO STORAGE DEVICES WITHIN A STORAGE SYSTEM DUE TO MOVEMENT OF THE STORAGE SYSTEM

(71) Applicant: DELL PRODUCTS, L.P., Round Rock, TX (US)

(72) Inventors: Sandor Farkas, Round Rock, TX (US); Syed S. Ahmed, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 14/724,768

(22) Filed: May 28, 2015

(65) Prior Publication Data

US 2015/0262601 A1    Sep. 17, 2015

Related U.S. Application Data (63) Continuation of application No. 13/893,705, filed on May 14, 2013, now Pat. No. 9,082,439.

(51) Int. Cl.
*G06F 13/00* (2006.01)
*G11B 5/55* (2006.01)
*G11B 19/04* (2006.01)
*G11B 17/22* (2006.01)

(52) U.S. Cl.
CPC ............ *G11B 5/5582* (2013.01); *G11B 17/228* (2013.01); *G11B 19/042* (2013.01)

(58) Field of Classification Search
None
See application file for complete search history.

(56) References Cited

U.S. PATENT DOCUMENTS

| | | | |
|---|---|---|---|
| 6,014,319 A * | 1/2000 | Kuchta | G06F 1/184 307/43 |
| 8,081,237 B2 | 12/2011 | Ito | |
| 8,659,250 B2 | 2/2014 | Maiocchi et al. | |
| 2003/0053240 A1 | 3/2003 | Bruner et al. | |
| 2008/0038877 A1* | 2/2008 | Wang | G06F 12/1416 438/125 |
| 2008/0104303 A1 | 5/2008 | Jeansonne et al. | |
| 2009/0228674 A1* | 9/2009 | Ouchi | G06F 3/0616 711/168 |
| 2010/0282932 A1* | 11/2010 | Ong | H05K 7/1489 248/206.5 |
| 2011/0219158 A1* | 9/2011 | Davis | G06F 13/00 710/300 |
| 2013/0191668 A1 | 7/2013 | Vichare et al. | |

\* cited by examiner

*Primary Examiner* — Sean D Rossiter
(74) *Attorney, Agent, or Firm* — Isidore PLLC (57) ABSTRACT

A method implemented in a storage system that has moveable storage devices includes a motion controller receiving movement related data of a storage device from at least one sensor associated with the storage device. In response to the received movement related data indicating at least one pre-identified condition, a park command is issued that triggers the reading head of the storage device to enter a parked state in which the storage device is protected from damage that can occur due to motion of the reading head while the pre-identified condition exists.

16 Claims, 10 Drawing Sheets

Example passing case

PREVENTING DAMAGE TO STORAGE DEVICES WITHIN A STORAGE SYSTEM DUE TO MOVEMENT OF THE STORAGE SYSTEM

RELATED APPLICATION

This application is a continuation application of U.S. patent application Ser. No. 13/893,705, filed May 14, 2013, which is fully incorporated herein by reference.

BACKGROUND

1. Technical Field

The present disclosure generally relates to data storage systems and in particular to a system and method for preventing damage to storage devices that are moveable within a storage system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can be configured in several different configurations. The information handling system can include storage systems that use storage devices such as hard disk drives. Some hard disk drives are mounted to trays or racks that can be connected to live power and data connections in the information handling system. These disk drives are called hot swappable hard drives. In one configuration, a hot swappable hard drive is mounted to a tray that can be slid into engagement with a circuit board connector and removed from or slid out of engagement with the circuit board connector.

While hot swappable hard drives are useful for adding storage capacity and maintenance in a real time environment, they are susceptible to damage caused by movement of the hard drive during translation of the tray containing these hard drives. The hard drive platter is subject to mechanical motion damage from movement of the read/write head if the hard drive is subjected to excessive acceleration or deceleration forces during movement. Thus, the present storage systems and devices do not provide adequate protection for the operation of the storage devices.

BRIEF SUMMARY

Disclosed is a method, a storage system, and an information handling system (IHS) that enables the reading head of a storage device to enter a parked state in which the storage device is protected from damage in response to detection of mechanical motion that can cause damage to the storage device.

According to a one embodiment, the method is implemented in a storage system that has moveable storage devices. A motion controller receives movement related data of a storage device from at least one sensor associated with the storage device. The method further includes determining if the received movement related data indicates that at least one pre-identified condition exist, which can result in damage to the storage device. In response to the received movement related data indicating at least one pre-identified condition, a park command is issued that triggers the read/write head of the storage device to enter a parked state in which the storage device is protected from damage that can occur due to mechanical shock of the read/write head while the pre-identified condition exists.

Also disclosed is a storage system that includes at least one storage device and a storage controller that is communicatively coupled to the at least one storage device for controlling operations of the storage system. The storage system also includes at least one sensor that tracks and records movement related data that corresponds to movement of the storage device. A motion controller is coupled to the at least one sensor and comprises logic that receives the movement related data from the at least one sensor and determines if the received movement-related data indicates at least one pre-identified condition that can result in damage to the storage device. In response to the received movement related data indicating a presence of at least one pre-identified condition, a park command is issued that triggers the reading head of the storage device to enter the parked state.

Also disclosed is an information handling system (IHS) that includes one or more processors and a storage system communicatively coupled to the processor. The storage system comprises at least one storage device and a storage controller that is coupled to the storage device for controlling operations of the storage system. At least one sensor tracks and records movement related data that corresponds to movement of the storage device. A motion controller is communicatively coupled to the at least one sensor. The motion controller has firmware executing thereon to provide control of storage device operations. The firmware configures the motion controller to receive the movement related data from the at least one sensor and determine if the received movement-related data indicates at least one pre-identified condition that can result in damage to the storage device. In response to the received movement related data indicates a presence of at least one pre-identified condition, a park command is issued that triggers the reading head of the storage device to enter the parked state.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide an information handling system (IHS), a storage system and a method that enables the read/write head of a storage device to enter a parked state in which the storage device is protected from damage in response to prediction of a pending impact that can cause damage to the storage device due to the storage sled reaching the end of travel on a sled guide.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
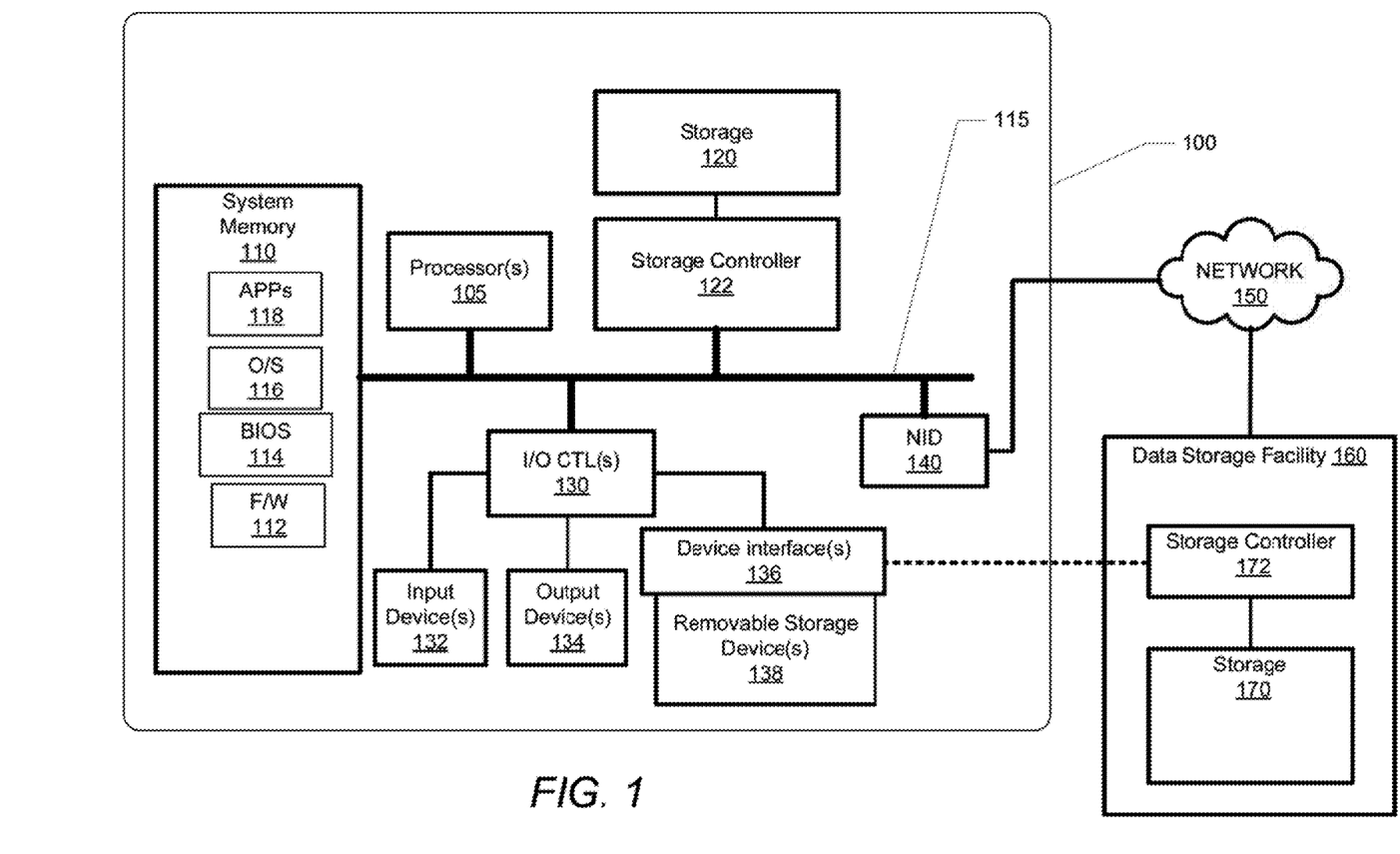
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is a storage controller 122 coupled to local storage 120 within which can be stored one or more software and/or firmware modules and/or data (not specifically shown). In one embodiment, local storage 120 can be one or more hard drive storage devices. The one or more software and/or firmware modules within local storage 120 can be loaded into system memory 110 during operation of IHS 100. As shown, system memory 110 can include therein a plurality of modules, including firmware (F/W) 112, basic input/output system (BIOS) 114, operating system (O/S) 116, and application(s) 118. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output device(s) 134, such as a monitor or display device or audio speaker(s). Additionally, in one or more embodiments, one or more device interfaces 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can also provide an integration point for connecting other device(s) to IHS 100. In such implementation, device interface(s) 136 can further include General Purpose I/O interfaces such as $I^2C$, SMBus, and peripheral component interconnect (PCI) buses.

IHS 100 comprises a network interface device (NID) 140. NID 140 enables IHS 100 to communicate and/or interface with other devices, services, and components that are located external to IHS 100. These devices, services, and components can interface with IHS 100 via an external network, such as example network 150, using one or more communication protocols.

Network 150 can be a local area network, wide area network, personal area network, and the like, and the connection to and/or between network and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In the illustrative embodiment, network 150 also provides access to data storage facility 160, which can include a plurality of storage devices such as hard disk drives or other storage media. In one embodiment, data storage facility 160 includes an array of hard disk drives. Data storage facility 160 also includes a storage controller 172 that is coupled to storage 170 within which can be stored software and/or firmware and one or more sets of data (not specifically shown). In an alternate embodiment, and as represented by the dashed interconnecting lines, data storage facility 160 can be directly connected to IHS 100 as an external storage device.

Figure 2:
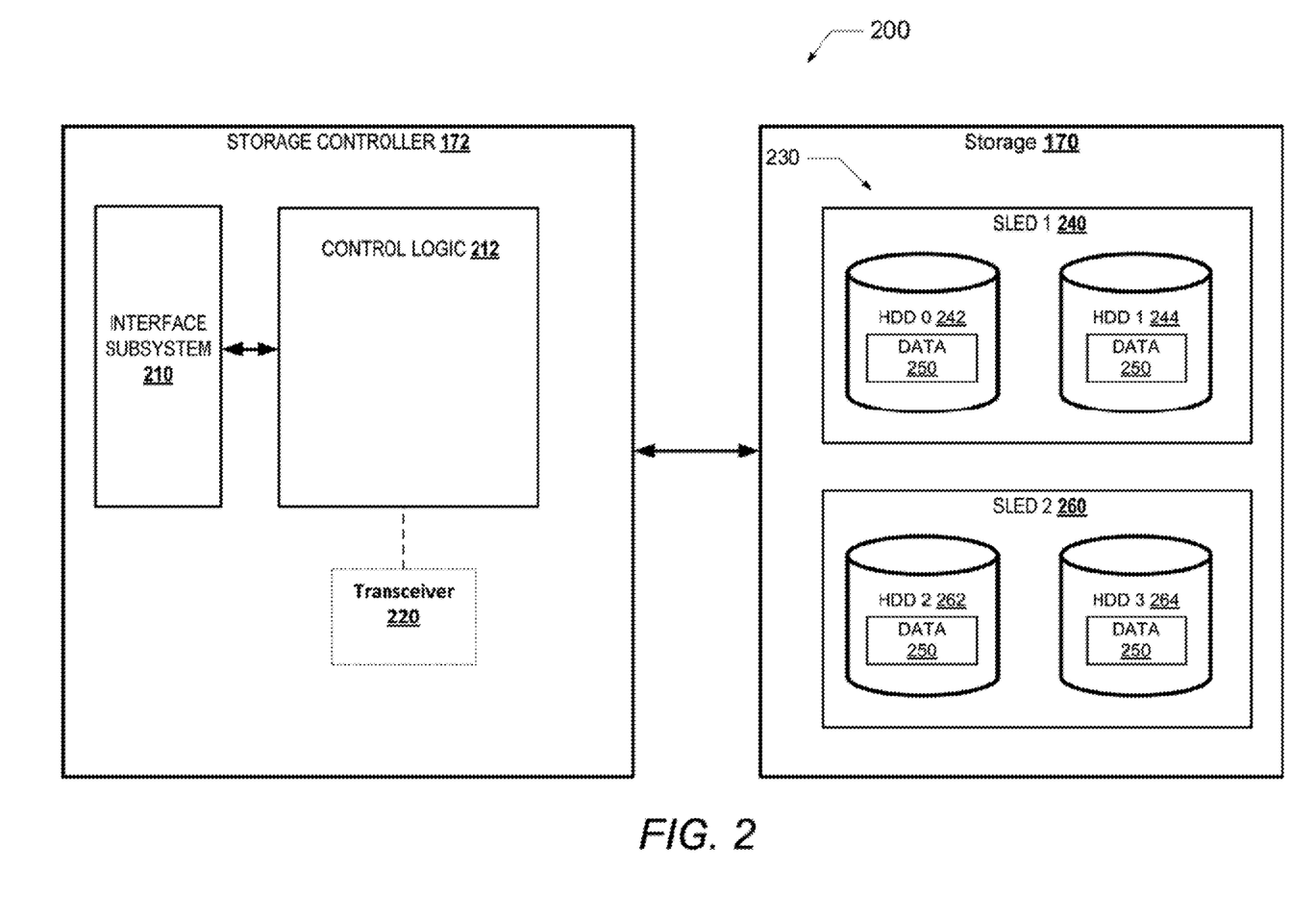
FIG. 2 illustrates a block diagram of an example storage system, in accordance with one or more embodiments.

With reference now to FIG. 2, there is illustrated one embodiment of storage subsystem 200 that can be utilized within IHS 100 and/or data facility 160 to store data, software and firmware. In the discussion of FIG. 2, reference is also made to elements described in FIG. 1. Storage subsystem 200 can generally include local storage 120 and storage controller 122 that controls and manages the flow of commands and data to and from local storage 120 (FIG. 1). In an alternative embodiment, storage subsystem 200 can also represent storage 170 and storage controller 172 of data storage facility 160. For the remainder of this description, storage subsystem 200 is described as comprising storage 170.

In one embodiment, storage 170 comprises an array 230 of storage devices such as hard disk drives (HDD) that are mounted to moveable sleds 240 and 260. HDD 0 242 and HDD 1 244 are mounted to sled 1 240. HDD 2 262 and HDD 3 264 are mounted to sled 2 260. While two storage devices are shown mounted to each sled, more or fewer storage devices can be mounted to each sled. While four storage devices are shown within array 230, more or fewer storage devices can be included within storage 170. In some embodiments, array 230 can include hundreds of hard drives. In one embodiment, HDDs 242-264 are hot swappable hard disk drives that can be plugged and unplugged into powered connections of storage 170. HDDs 242-264 can be conventional hard disk drives that contain magnetic media arranged on rotating platters that are accessed by a moveable read/write head. HDDs 242-264 can store one or more sets of data 250.

Storage controller 172 contains the logic necessary to read and write to HDDs 242-264. Storage controller 172 comprises interface subsystem 210 and control logic 212. Interface subsystem 210 manages communications between control logic 212 and system interconnect 115 or data storage facility 160 (both of FIG. 1). Control logic 212 comprises logic and firmware to read and write to HDDs 242-264. Control logic 212 also comprises firmware that can trigger storage devices HDDs 242-264 to park their respective read/write heads. An optional transceiver 220 is in communication with control logic 212. Transceiver 220 enables wireless communication between storage controller 172 and components of storage 170 as will be described in detail later.

Those of ordinary skill in the art will appreciate that the hardware components and basic configuration depicted in the various figures (e.g., FIGS. 1 and 2) and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

Figure 3:
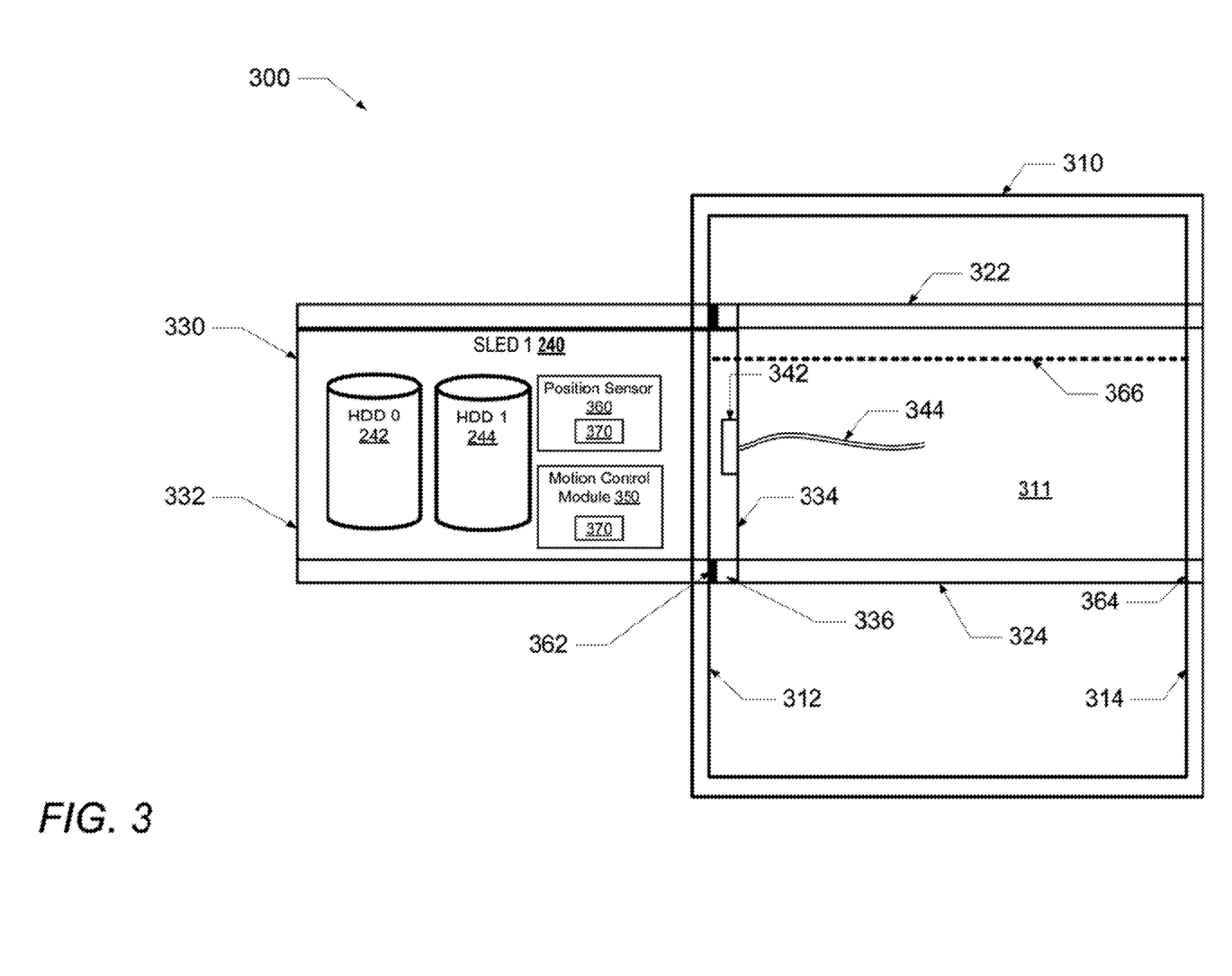
FIG. 3 illustrates an example storage system chassis, translating sled and moveable storage device, in accordance with one or more embodiments.

FIG. 3 illustrates details of storage system chassis 300 that contains translating sled 1 240. In the discussion of FIG. 3, reference is also made to elements described in FIG. 1 and FIG. 2. Storage system chassis 300 includes a support frame 310 that encloses an internal cavity 311. Frame 310 includes a front beam 312 and a rear beam 314. An elongated upper rail 322 and an elongated lower rail 324 are mounted to frame 310. Sled 1 240 is coupled for sliding movement to upper and lower rails 322 and 324. Sled 1 240 can slide or translate in a linear direction along rails 322 and 324 between an inserted position in which sled 1 240 is contained within support frame 310 and a removed or extended position in which sled 1 240 is external to internal cavity 311 of support frame 310 (shown in FIG. 3).

Sled 1 240 further includes a case 330 that has a front end 332 and a back end 334. A pair of stops 336 extend away from opposite sides of sled 1 240 adjacent to back end 334. When sled 1 240 is fully inserted into support frame 310, the back end 334 of case 330 will abut or contact rear beam 314 at an inserted end of travel position 364. When sled 1 240 is fully extended from support frame 310, stops 336 of case 330 will abut or contact front beam 312 in an extended end of travel position 362. Sled 1 240 can travel in along a guide path 366 between inserted end of travel position 364 and extended end of travel position 362. It is appreciated that the movement of the storage system and/or sled 1 240 can also include sideways travel or vertical up-down travel and/or a push or pull in one or more directions, and that the sensors utilized can, in one or more embodiments, also account for such movement and respond to such movement by parking the read/write head, based on the detected movement falling outside of acceptable, safe boundaries for such movement, in order to prevent damage to the storage devices.

A motion control module 350 and a position sensor 360 are attached to sled 1 240. Motion control module 350 contains at least one motion sensor that detects motion and generates motion related data. Motion control module 350 also contains control logic. The motion sensor can include an acceleration sensor or gyroscope, or other form or type of device that detects acceleration and deceleration of sled 1 240 (or measures changes in speed over a known period to time) and generates acceleration data. Position sensor 360 detects the position of sled 1 240 along path 366 and generates position data. In an embodiment, position sensor 360 can be one of a proximity sensor, an infrared sensor or a Hall Effect sensor used with a magnet, or other form of sensor technology. In one embodiment, HDDs 242 and 244, motion control module 350 and position sensor 360 are in communication with storage controller 122 via connector 342 and electrical cable 344. In one or more embodiments, the position of the motion control module 350 can vary within sled 1 240. Also, in one or more embodiments, position sensor 360 can be positioned outside sled 1 240. In yet another embodiment, HDDs 242 and 244, motion control module 350 and position sensor 360 are communicatively coupled to storage controller 122 via wireless transceiver 370, which communicates with transceiver 220 (FIG. 2) via a wireless signal. In one or more embodiments, sled 1 240 can also include a velocity sensor (not shown), which can be utilized to measure or obtain speed information. In such embodiments, the speed information does not need to be calculated from acceleration data.

Figure 4:
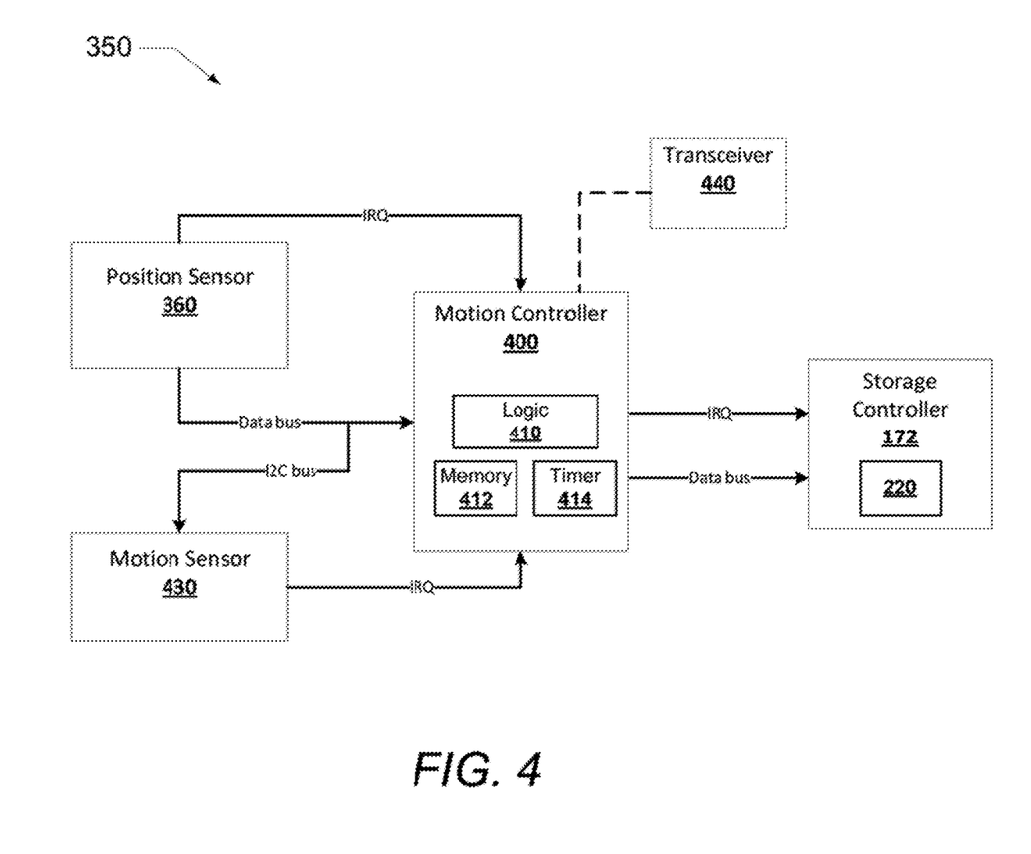
FIG. 4 illustrates an example motion control module, in accordance with one or more embodiments.

FIG. 4 illustrates further details of motion control module 350. In the discussion of FIG. 4, reference is also made to elements described in FIGS. 1-3. Motion control module 350 comprises a motion controller 400 that is coupled to position sensor 360, motion sensor 430, optional transceiver 440 and storage controller 172 via data and interrupt lines. The data lines enable the transmission of data to and from motion controller 400. The interrupt lines enable the attached components to signal or flag motion controller 400 to the presence of data on the data lines. In one embodiment, motion controller 400 is a micro-controller or other programmable logic. Additionally, in alternate embodiments, the distance and speed can be calculated utilizing an analog Operational (OP) amplifier (not shown). Motion controller 400 has internal logic 410, memory 412 and a timer 414. Functions, modules, routines, methods and processes of the present disclosure can be provided as firmware code and/or logic within logic 410. The firmware code executes within logic 410 to provide the functionality of protecting HDDs 242-264 from damage due to excessive motion along the path 366 (FIG. 3).

Motion sensor 430 generates motion related data. Motion sensor 430 can include an acceleration sensor or gyroscope that detects acceleration and deceleration of sled 1 240 and generates acceleration data. Position sensor 360 detects the position of sled 1 240 along path 366 and generates position data. In an optional embodiment, transceiver 440 facilitates wireless communications between motion control module 350 and transceiver 220 of storage controller 172.

Figure 5:
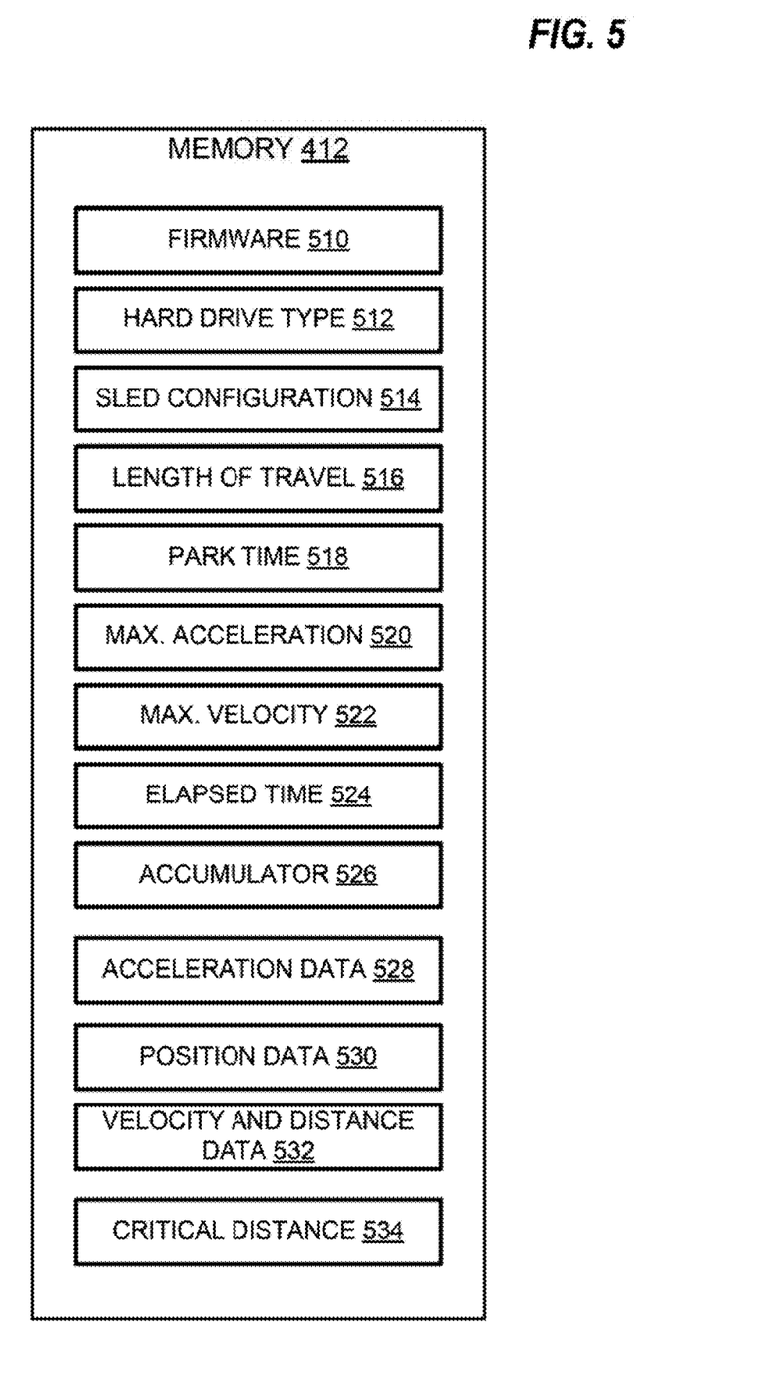
FIG. 5 illustrates an example of the contents of a motion controller memory in accordance with one or more embodiments.

Turning to FIG. 5, there is illustrated example content of motion controller memory 412. In the discussion of FIG. 5, reference is also made to elements described in FIGS. 1-4. Memory 412 includes firmware 510. Firmware 510 executes on logic 410 to determine when a park command is to be issued to HDDs 242-264, based upon received motion and position data. Memory 412 stores data and information such as the hard disk drive type 512 of HDDs 242-264, sled configuration data 514 of sleds 240 and 260, and the length of travel 516 of path 366.

Memory 412 further stores park time 518, maximum acceleration threshold 520, maximum velocity threshold 522, and elapsed time 524. Park time 518 is the length of time for the read/write head of each respective hard drive to move from an operating position to the parked position. The maximum acceleration threshold 520 is the largest value of acceleration or deceleration that HDDs 242-264 are allowed to be subjected to before triggering a park response. If the maximum acceleration threshold 520 is exceeded, HDDs 242-264 are placed in a parked operating state. In the parked operating state, the read/write heads are moved away from the rotating platter to a parked position away from the rotating platter. The maximum velocity threshold 522 is the largest value of velocity, in either direction, that HDDs 242-264 are allowed to be subjected to. If the maximum velocity threshold 522 is exceeded, HDDs 242-264 are placed in a parked operating state. The elapsed time 524 records the sled's travel time and is the time period that has elapsed since timer 414 was last reset. Memory 412 also contains one or more accumulators 524. Accumulator 526 sums changes in velocity and distance as sleds 240 and 260 move. Memory 412 also stores acceleration data 528 generated by motion sensor 430, position data 530 generated by position sensor 360, and velocity and distance data 532 calculated by logic 410. Memory 412 also stores critical distance 534.

FIGS. 6-9 illustrate example graphs for translating sled 1 240 containing HDDs 242 and 244. In the discussion of the figures, reference is also made to elements described in FIGS. 1-5. FIGS. 6-9 can refer to either pulling sled 1 240 out of frame 310 or pushing sled 1 240 into frame 310. For simplicity, the discussion of FIGS. 6-9 will only refer to pushing sled 1 240 into frame 310. Turning to FIG. 6A, an example graph of acceleration versus time is shown, with possible acceleration ranging between a maximum acceleration 604 and a zero acceleration 606. At an initial time 602, sled 1 240 is fully extended from frame 310 and is at rest. As sled 1 240 is inserted into frame 310, sled 1 240 will initially increase in acceleration, possibly up to maximum acceleration 604. As shown, sled 1 240 can then decelerate towards zero acceleration 606. At time 610, the back end 334 of sled case 330 will abut or contact at least one of rear beam 314, or other mechanical stops (not shown), or some other stopping mechanism (not shown) implemented at an inserted end of travel position 364, causing a sudden deceleration of sled 1 240.

Figure 6A:
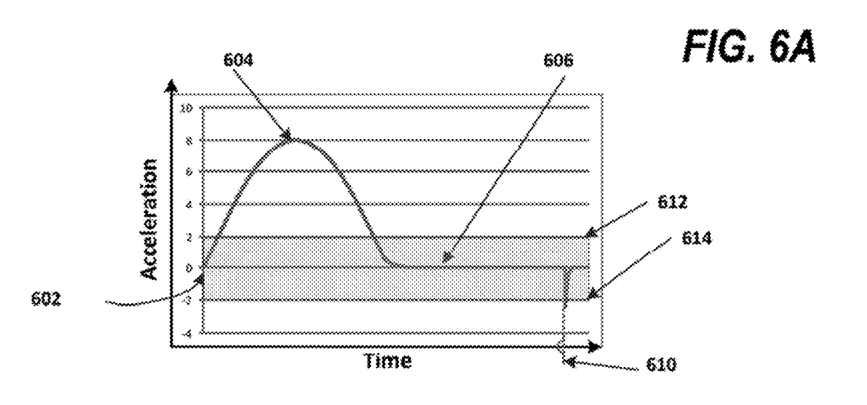
FIG. 6A is a graph of acceleration versus time for a storage device, according to one or more embodiments.

FIG. 6A also illustrates a maximum acceleration limit or threshold 612 and a maximum deceleration limit or threshold 614. The area between limits 612 and 614 is the operating region for HDDs 242 and 244 where the hard drives are allowed to operate. In FIG. 6A, the acceleration of sled 1 240 has initially exceeded the maximum acceleration limit 612 and then exceeded the maximum deceleration limit 614. The areas above or below limits 612 and 614, respectively are non-operating regions for HDDs 242 and 244 where the hard drives are triggered by logic 410 to be placed in a non-operational parked state that prevents damage to the hard drives.

Figure 6B:
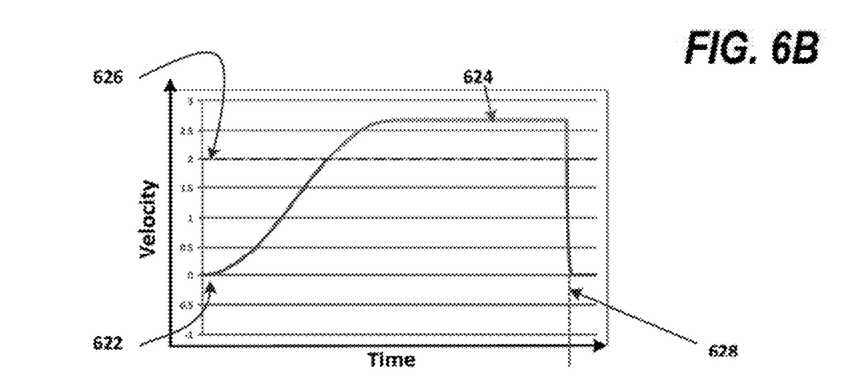
FIG. 6B is a graph of velocity versus time for a storage device, according to one or more embodiments.

FIG. 6B illustrates an example graph of velocity versus time for translating sled 1 240 containing HDDs 242 and 244. At an initial time 622, sled 1 240 is fully extended from frame 310 and is at rest. As sled 1 240 is inserted into frame 310, sled 1 240 will increase in velocity up to a maximum velocity 624. At time 628, the back end 334 of sled case 330 will abut or contact rear beam 314 at an inserted end of travel position 364 causing a sudden drop in the velocity of sled 1 240 to zero velocity.

FIG. 6B also illustrates a maximum velocity limit or threshold 626. The area below limit 626 is the operating region for HDDs 242 and 244 where the hard drives are allowed to operate. In FIG. 6B, the velocity of sled 1 240 has exceeded the maximum velocity limit 626. The area above limit 626 is a non-operating region for HDDs 242 and 244 where the hard drives are triggered by logic 410 to be placed in a non-operational parked state that prevents damage to the hard drives. Logic 410 calculates if the velocity of the hard drives will exceed the maximum limits and issues a park command, if the limits are predicted to be exceeded.

Figure 6C:
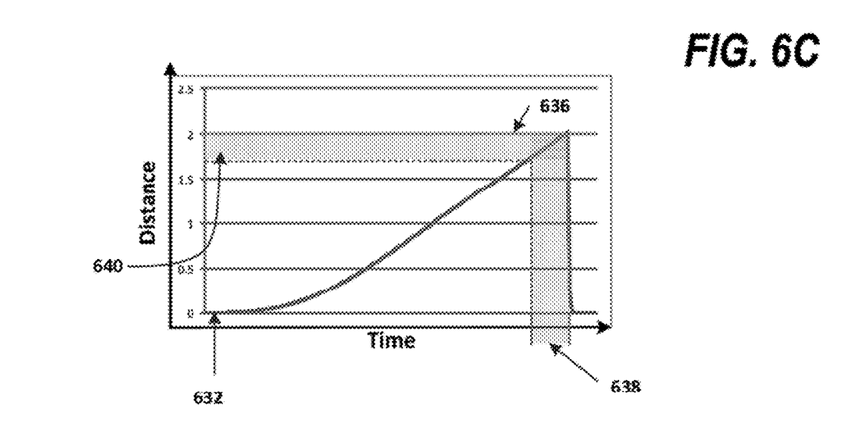
FIG. 6C is a graph of distance versus time for a storage device, according to one or more embodiments.

FIG. 6C illustrates an example graph of distance versus time for translating sled 1 240 containing HDDs 242 and 244. At an initial time 632, sled 1 240 is fully extended from frame 310 and is at rest. As sled 1 240 is inserted into frame 310, sled 1 240 will travel along path 366 toward mechanical stop 636 (end of travel position 364). As sled 1 240 moves toward mechanical stop 636, a time to impact 638 will be reached. The time to impact 638 is the time that it will take sled 1 240 to contact rear beam 314 at the end of travel position 364 (mechanical stop 636). The time to impact 638 is calculated based on the known velocity and position of the sled.

FIG. 6C also illustrates a critical distance 640, which can be synonymous with critical distance 534 (FIG. 5). The critical distance 640 is the minimum distance from the end of travel position that is required for sled 1 240 to safely decelerate before hitting the end of travel position 364 (mechanical stop 636). The critical distance 640 is calculated based on the known velocity and position of the sled.

Figure 7A:
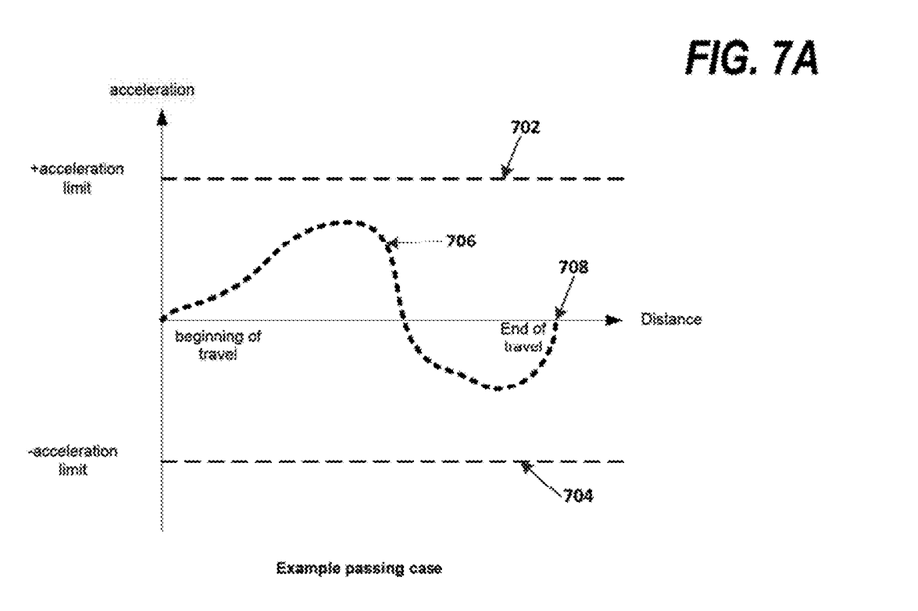
FIG. 7A is a graph of acceleration versus distance for a storage device in which the acceleration is within pre-defined limits, according to one or more embodiments.
Figure 7B:
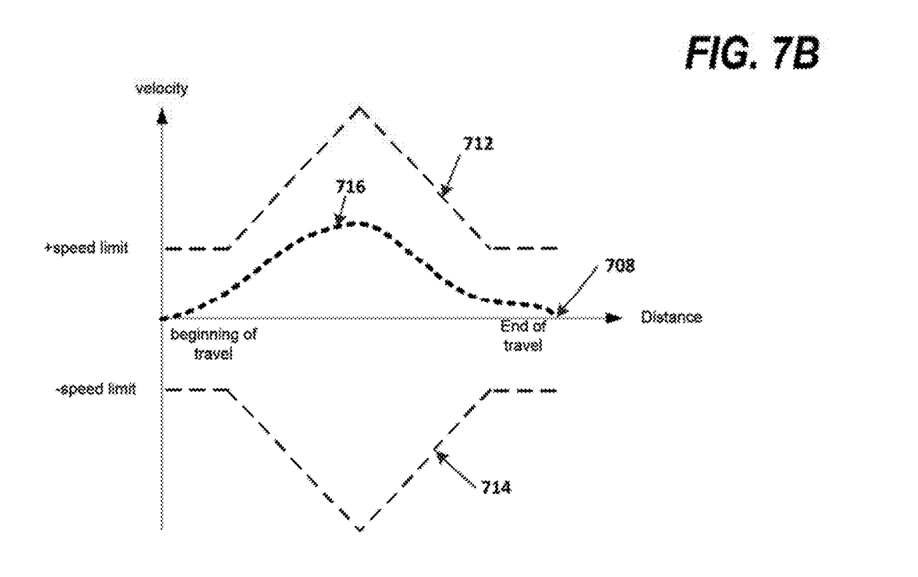
FIG. 7B is a graph of velocity versus distance for a storage device in which the velocity is within pre-defined limits, according to one or more embodiments.
Figure 8A:
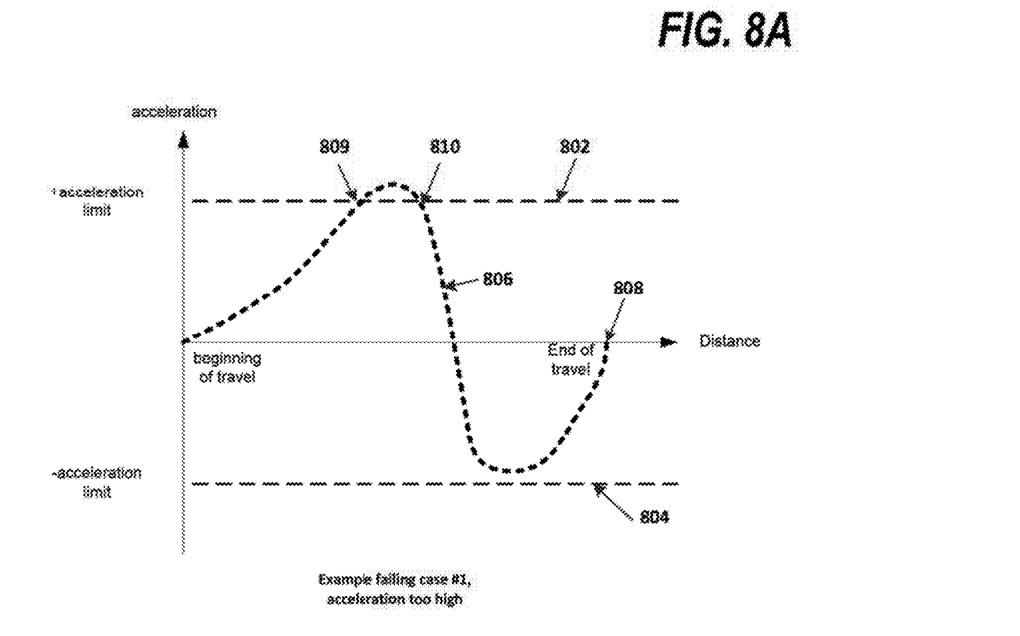
FIG. 8A is a graph of acceleration versus distance for a storage device in which the acceleration exceeds the maximum pre-defined limit, according to one or more embodiments.
Figure 8B:
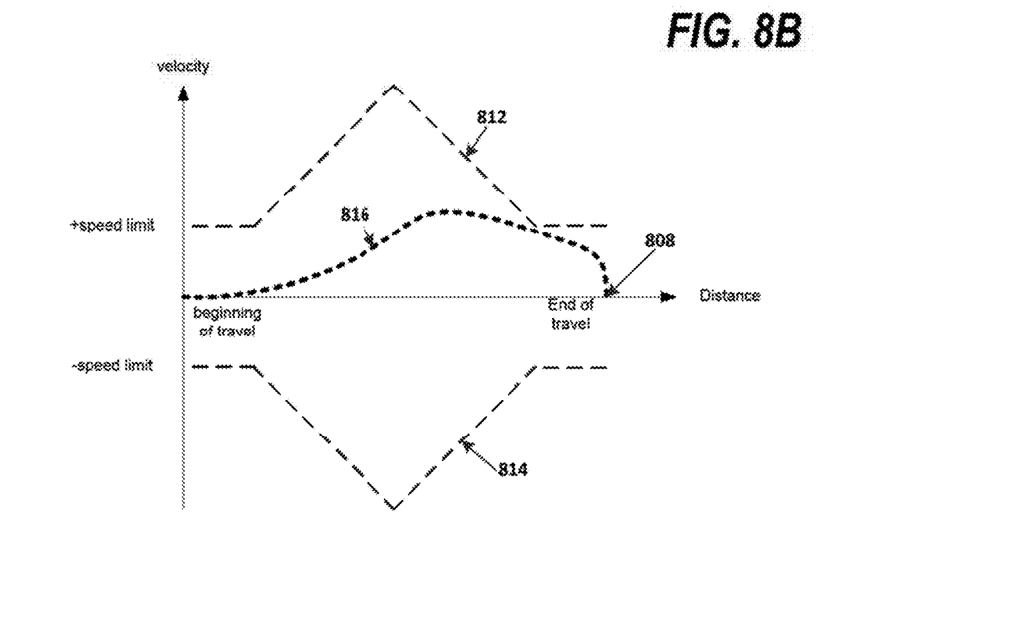
FIG. 8B is a graph of velocity versus distance for a storage device in which the velocity is within pre-defined limits, according to one or more embodiments.
Figure 9A:
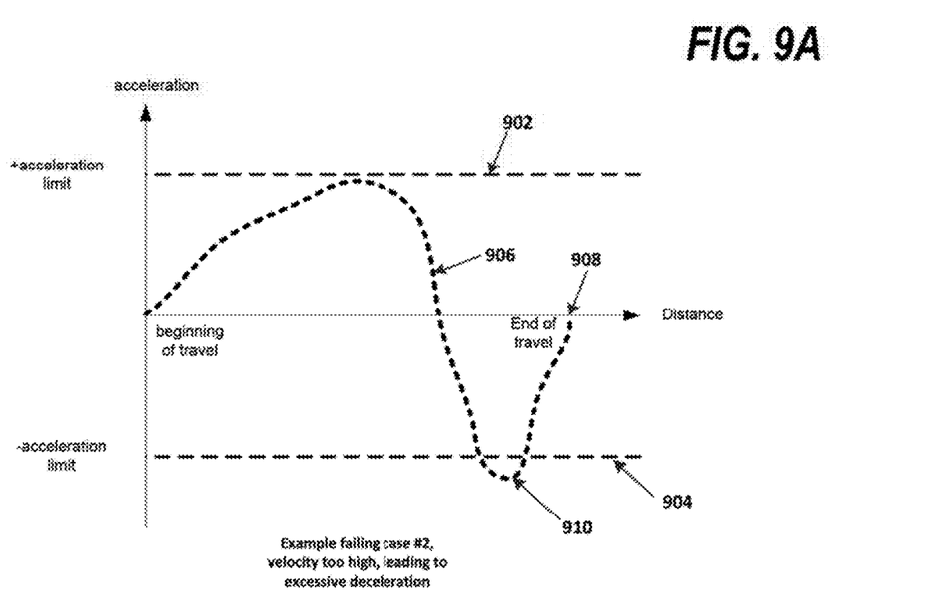
FIG. 9A is a graph of acceleration versus distance for a storage device in which the acceleration exceeds the maximum pre-defined limit, according to one or more embodiments.
Figure 9B:
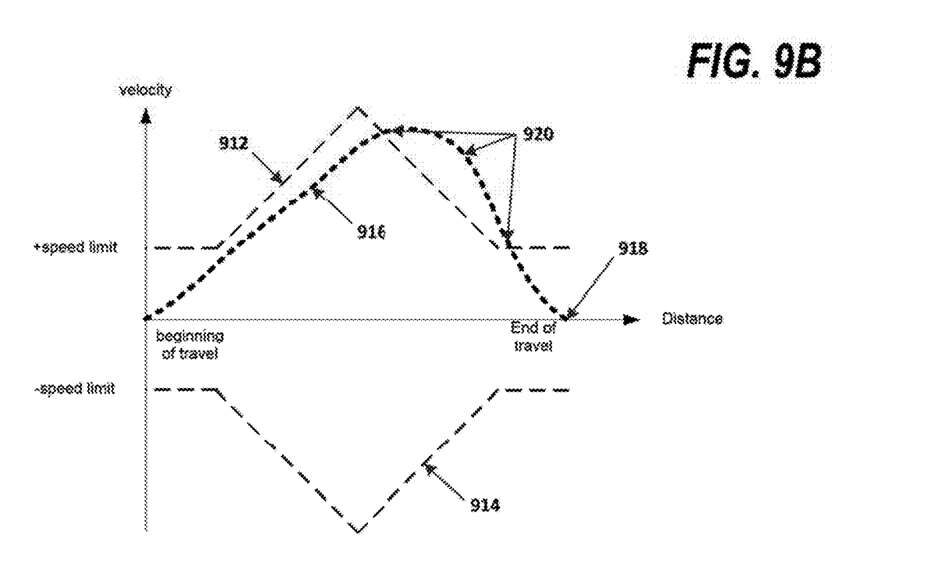
FIG. 9B is a graph of velocity versus distance for a storage device in which the velocity exceeds the maximum pre-defined limit, according to one or more embodiments.

FIGS. 7A, 8A and 9A illustrate example graphs of acceleration versus distance for translating sled 1 240 containing HDDs 242 and 244. FIGS. 7B, 8B and 9B illustrate example graphs of velocity versus distance for translating sled 1 240 containing HDDs 242 and 244.

FIG. 7A shows a positive acceleration threshold or limit 702, a negative acceleration (deceleration) threshold or limit 704 and the acceleration profile 706 of the sled as detected by motion sensor 430. The sled travels into chassis 300 until it reaches the end of travel position 708. FIG. 7B shows a positive velocity (speed) threshold or limit 712, a negative velocity (speed) threshold or limit 714 and the velocity profile 716 of the sled as calculated by controller logic 410. The sled travels into chassis 300 until it reaches the end of travel position 708. In FIG. 7A, the acceleration profile 706 is within the maximum positive and negative threshold values, and in FIG. 7B, the sled velocity profile 716 is within the maximum positive and negative threshold values. Because the acceleration and velocity of the sled are calculated by logic 410 to be less than the maximum limits, HDDs 242 and 244 continue to operate and read and write data during movement of the sled.

FIG. 8A shows a positive acceleration threshold or limit 802, a negative acceleration (deceleration) threshold or limit 804, and the acceleration profile 806 of the sled as detected by motion sensor 430. The sled travels into chassis 300 until the sled reaches the end of travel position 808. FIG. 8B shows a positive velocity (speed) threshold or limit 812, a negative velocity (speed) threshold or limit 814 and the velocity profile 816 of the sled as calculated by controller logic 410. The sled travels into chassis 300 until the sled reaches the end of travel position 808. In FIG. 8A, the acceleration profile 806 has exceeded the maximum threshold limit 802 at point 809 and in FIG. 8B, the sled velocity profile 816 is within the maximum threshold values. Because the acceleration of the sled has exceeded the maximum limit, between points 809 and 810, controller logic 410 predicts the "out of specification" acceleration and issues a park command to storage controller 122 that triggers the HDDs 242-244 to enter a non-operational parked state.

FIGS. 9A and 9B are presented for viewing together and are described together for clarity. FIG. 9A shows a positive acceleration threshold or limit 902, a negative acceleration (deceleration) threshold or limit 904, and the acceleration profile 906 of the sled as detected by motion sensor 430. The sled travels into chassis 300 until the sled reaches the end of travel position 908. FIG. 9B shows a positive velocity (speed) threshold or limit 912, a negative velocity (speed) threshold or limit 914 and the velocity profile 916 of the sled as calculated by controller logic 410. The sled travels into chassis 300 until the sled reaches the end of travel position 908. In FIG. 9B, the velocity profile 916 has exceeded that maximum velocity limit 912 at points 920. Because of the high velocity, there is insufficient time for the sled to decelerate before it reaches the end of travel position 918. As shown in FIG. 9A, this causes the sled to hit the frame 310 resulting in a negative acceleration (deceleration) that exceeds the maximum negative acceleration threshold limit 904 at point 910. Because both the velocity and the acceleration of the sled has exceeded the maximum limits, controller logic 410 predicts the out of specification velocity and acceleration and issues a park command to storage controller 122 that triggers the HDDs 242-244 to enter a non-operational parked state before any damage can occur.

Figure 10:
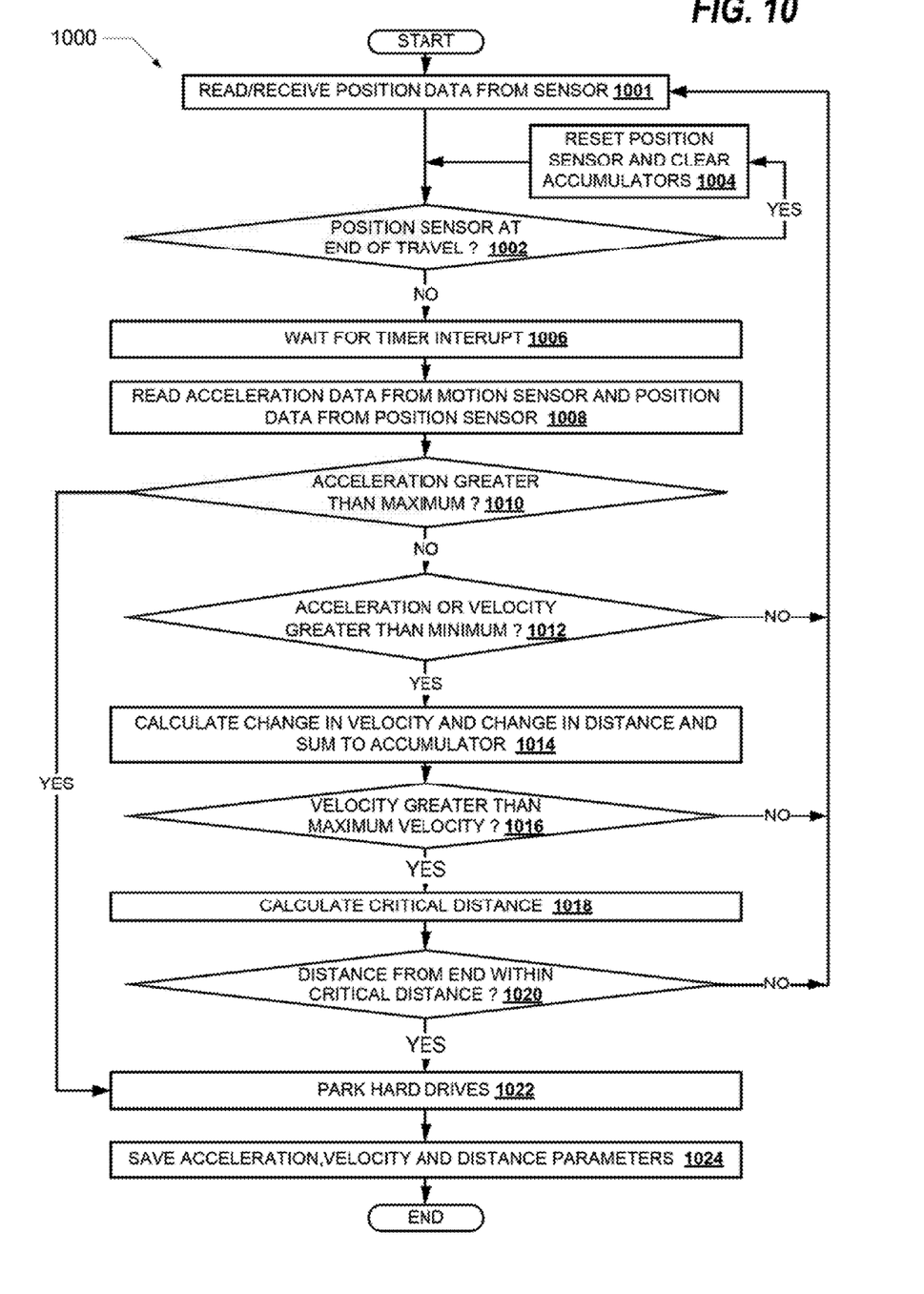
FIG. 10 is a flow chart illustrating one example of the method by which storage devices are parked to prevent mechanical damage, according to one or more embodiments.

FIG. 10 illustrates a flowchart of an exemplary method by which IHS 100 and motion controller 400, presented within the preceding figures, perform different aspects of the processes that enable one or more embodiments of the disclosure. Generally, method 1000 represents a controller/logic implemented method to determine when hard disk drives should be parked to prevent damage due to motion. The description of the method is provided with general reference to the specific components illustrated within the preceding figures. Generally method 1000 is described as being implemented via logic 410 and particularly the execution of code provided by software/firmware 510 acting within logic 410. It is however appreciated that certain aspects of the described methods may be implemented via other processing devices and/or execution of other code. In the discussion of FIG. 10, reference is also made to elements described in FIG. 1-FIG. 5.

FIG. 10 illustrates an example method by which HDDs 242-244 are parked to prevent damage due to motion. Method 1000 begins at the start block and proceeds to block 1001 where controller logic 410 reads and/or receives position data from position sensor 360. At decision block 1002, controller logic 410 determines if sled 1 240 is at either one of the end of travel positions 362 or 364. In response to sled 1 240 being at one of the end of travel positions 362 or 364, controller logic 410 resets the position sensor 360 and clears the accumulators 526 (block 1004). The resetting of the position sensor 360 and clearing of the accumulator 526 avoids data drift, which may otherwise occur. It is appreciated that other methodologies may be implemented to achieve this result of recalibrating the sensor to avoid data drift. In response to sled 1 240 not being at one of the end of travel positions 362 or 364, controller logic 410 waits for timer 414 to issue an interrupt to controller logic 410 (block 1006). Timer 414 provides a repeating sampling time period and issues an interrupt after the pre-defined sampling time period has expired. According to one embodiment, timer 414 also allows for delay between acceleration samples taken. This delay is to provide time for all of the calculations to be completed before a new value of acceleration is fed into the microcontroller. According to the disclosure, timer 414 is a variable, which can range between 0 milliseconds up to whatever larger time is needed for the microcontroller to complete the calculations. According to one embodiment, a possibility exists to read data for logging and debugging purposes. Having timer 414 also ensures that acceleration being read corresponds to the speed and distance numbers. Otherwise, there could be a mismatch of information between acceleration being read and the calculated values of speed and distance due to a lag created because of the calculations. In one embodiment, timer 414 also balances an amount of information that flows into the microcontroller. This balancing is important because if the sensor polls faster than the microcontroller can calculate the speed and distance, the input of the microcontroller will over flow. Controller logic 410 reads acceleration data from motion sensor 430 and position data from position sensor 360 at block 1008.

Controller logic 410 determines if the acceleration of sled 1 240 is greater than a maximum acceleration limit 612 or maximum deceleration limit 614 (decision block 1010). In response to the acceleration of sled 1 240 being greater than the maximum acceleration or deceleration limits, controller logic 410 issues a park command (block 1022) to storage controller 122 that triggers the HDDs 242-244 to enter a non-operational parked state. In the parked state, the read/write heads of HDDs 242-244 are held in a position away from the magnetic media such that mechanical motion of the read/write head does not cause damage to the magnetic media. At block 1024, controller logic 410 saves acceleration data 526, position data 528 and velocity and distance data 530 to memory 412. Method 1000 then ends.

Returning to decision block 1010, in response to the acceleration of sled 1 240 not being greater than the maximum acceleration or deceleration limits, controller logic 410 determines if sled 1 240 is stopped or at rest by comparing the acceleration and velocity of sled 1 240 to minimum threshold values for acceleration and velocity (decision block 1012). In response to the acceleration and velocity of sled 1 240 not being greater than the minimum threshold values for acceleration and velocity, method 1000 returns to block 1001, where controller logic 410 reads and receives position data from position sensor 360. This return to block 1001 and subsequent processing enables the avoidance of accumulating noise and error in the situations in which the sled is not moving. In response to the acceleration and/or velocity of sled 1 240 being greater than the minimum threshold values for acceleration and velocity, controller logic 410 calculates a change in velocity, if any and a change in distance and adds the change in velocity to the current velocity value stored in accumulator 524 and adds the change in distance to the current position value stored in accumulator 524 (block 1014).

Controller logic 410 determines if the velocity of sled 1 240 is greater than a maximum velocity threshold or limit 522 (decision block 1016). In response to the velocity of sled 1 240 not being greater than the maximum velocity threshold, method 1000 returns to block 1001, where controller logic 410 continues to read and/or receive position data from position sensor 360. In response to the velocity of sled 1 240 being greater than the maximum velocity threshold, controller logic 410 calculates a critical distance 534 (block 1018). The critical distance 534 is the minimum required distance to safely stop sled 1 240 without damage to HDDs 242-244 when the hard drives are in an operational state. Controller logic 410 calculates critical distance 534 based on the current velocity and current position of the sled and the time required to park the read/write head. The time required to park the read/write head is calculated by dividing the critical distance 534 by the current velocity of the sled.

Controller logic 410 determines if the distance from the end of travel position is less than or within the critical distance 534 (block 1020). In response to the distance from the end of travel position not being less than the critical distance, method 1000 returns to block 1001, where controller logic 410 continues to read and/or receive position data from position sensor 360. In response to the distance from the end of travel position being less than the critical distance, controller logic 410 issues a park command (block 1022) to storage controller 122 that triggers the HDDs 242-244 to enter a non-operational parked state. In the parked state, HDDs 242-244 are protected from damage due to mechanical motion. At block 1024, controller logic 410 saves acceleration data 526, position data 528 and velocity and distance data 530 to memory 412. Method 1000 then terminates at the end block.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment (e.g., via analog implementation) or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. In a storage system having moveable storage devices, a method comprising:
   a motion controller receiving movement related data of a storage device from at least one sensor associated with the storage device;
   wherein the storage device and the motion controller are mounted on a translating sled, which is configured for movement between a first end of travel position and a second end of travel position and the method further comprises monitoring movement of the translating sled between the first end of travel position and the second end of travel position to generate the movement related data; and
   in response to the received movement related data indicating at least one pre-identified condition, issuing a park command that triggers the reading head of the storage device to enter a parked state in which the storage device is protected from damage that can occur due to mechanical motion of the reading head while the pre-identified condition exists;
   wherein the motion controller includes a motion sensor and a position sensor and is communicatively coupled to the motion sensor and the position sensor such that the motion controller receives acceleration data and position data that corresponds to movement of the translating sled.

2. The method of claim 1, wherein the movement related data includes acceleration data and the method further comprises:
   an acceleration sensor detecting an acceleration of the storage device, generating the acceleration data of the storage device and transmitting the acceleration data to the motion controller;
   determining if the received acceleration data is greater than a maximum acceleration threshold; and
   in response to the received acceleration data being greater than the maximum acceleration threshold, issuing the park command that triggers the reading head of the storage device to enter the parked state.

3. The method of claim 1, further comprising:
   accumulating total distance and velocity within a distance accumulator and a velocity accumulator;
   determining if the storage device is at an end of travel position; and
   in response to the storage device being at the end of travel position, clearing the respective distance accumulator and velocity accumulator of an accumulated total travel distance and velocity.

4. In a storage system having moveable storage devices, a method comprising: a motion controller receiving movement data of a storage device from at least one sensor associated with the storage device, wherein the movement data includes position data; a position sensor detecting a position of the storage device, generating the position data of the storage device and transmitting the position data to the motion controller; determining a velocity of the storage device from the received movement data; calculating a critical distance to reach an end of travel position for the storage device based on the velocity and the position data; determining if the storage device can safely decelerate prior to reaching the end of travel position; and in response to the storage device not being able to safely decelerate prior to reaching the end of travel position, issuing a park command that triggers a reading head of the storage device to enter a parked state in which the storage device is protected from damage that can occur due to mechanical motion of the reading head while the pre-identified condition exists.

5. The method of claim 4, further comprising:
calculating a change in velocity and a change in distance for the storage device from the received movement data;
calculating a total velocity for the storage device;
determining if the total velocity is greater than a maximum total velocity threshold; and
in response to the total velocity being greater than the maximum total velocity threshold, issuing the park command that triggers the storage device to enter the parked state.

6. A storage system comprising:
at least one storage device;
a storage controller communicatively coupled to the at least one storage device for controlling operations of the storage system;
at least one sensor that tracks and records movement related data corresponding to movement of the storage device; and
a motion controller coupled to the at least one sensor and which comprises logic that:
receives the movement related data from the at least one sensor; and
in response to the received movement related data indicating at least one pre-identified condition, issues a park command that triggers the reading head of the storage device to enter a parked state in which the storage device is protected from damage that can occur due to mechanical motion of the read/write head while the pre-identified condition exists;
wherein the storage device and the motion controller are mounted on a translating sled, which is configured for movement along a rail, between a first end of travel position and a second end of travel position and the method further comprises monitoring movement of the translating sled between the first end of travel position and the second end of travel position to generate the movement related data;
wherein the motion controller includes a motion sensor and a position sensor and is communicatively coupled to the motion sensor and the position sensor such that the motion controller receives acceleration data and position data that corresponds to movement of the translating sled; and
wherein the motion controller is communicatively coupled to a storage controller and issuing of the park command comprises signaling the storage controller to issue the park command to the storage device.

7. The storage system of claim 6, wherein the movement related data includes acceleration data and the motion controller further comprises logic that:
detects an acceleration of the storage device;
generates the acceleration data of the storage device;
transmits the acceleration data to the motion controller;
determines if the received acceleration data is greater than a maximum acceleration threshold; and
in response to the received acceleration data being greater than the maximum acceleration threshold, issues the park command that triggers the reading head of the storage device to enter the parked state.

8. The storage system of claim 6, wherein the movement related data includes position data and the motion controller further comprises logic that:
generates the position data of the storage device and transmits the position data to the motion controller;
determines a velocity of the storage device from the received movement data;
determines if the storage device can safely decelerate prior to reaching the end of travel position; and
in response to the storage device not being able to safely decelerate prior to reaching the end of travel position, issues the park command that triggers the storage device to enter the parked state.

9. The storage system of claim 8, wherein in determining if the storage device can safely decelerate the logic further calculates a critical distance to reach an end of travel position for the storage device based on the velocity and the position data.

10. The storage system of claim 6, wherein the motion controller further comprises logic that:
calculates a change in velocity and a change in distance for the storage device from the received movement data;
calculates a total velocity for the storage device;
determines if the total velocity is greater than a maximum total velocity threshold; and
in response to the total velocity being greater than the maximum total velocity threshold, issues the park command that triggers the storage device to enter the parked state.

11. The storage system of claim 6, wherein the motion controller further comprises logic that:
accumulates total distance and velocity within a distance accumulator and a velocity accumulator;
determines if the storage device is at an end of travel position; and
in response to the storage device being at the end of travel position, clears the respective distance accumulator and velocity accumulator of an accumulated total travel distance and velocity.

12. An information handling system (IHS) comprising:
one or more processors;
a storage system coupled to the processor and in communication with the processor, the storage system comprising at least one storage device and a storage controller coupled to the storage device for controlling operations of the storage system;
at least one sensor that tracks and records movement related data corresponding to movement of the storage device;
a motion controller communicatively coupled to the at least one sensor, the motion controller having firmware executing thereon to provide control of storage device operations, wherein the firmware configures the motion controller to:
determine if received movement-related data indicates at least one pre-identified condition that can result in damage to the storage device; and
in response to the received movement related data indicating at least one pre-identified condition, issue a park command that triggers the reading head of the storage device to enter a parked state in which the storage device is protected from damage that can occur due to mechanical motion of the reading head while the pre-identified condition exists;

wherein the storage device and the motion controller are mounted on a translating sled, which is configured for movement along a rail between a first end of travel position and a second end of travel position and the method further comprises monitoring movement of the translating sled between the first end of travel position and the second end of travel position to generate the movement related data; and wherein the motion controller includes a motion sensor and a position sensor and is communicatively coupled to the motion sensor and the position sensor such that the motion controller receives acceleration data and position data that corresponds to movement of the translating sled.

13. The IHS of claim 12, wherein the motion controller is communicatively coupled to a storage controller and issuing of the park command comprises signaling the storage controller to issue the park command to the storage device.

14. The information handling system of claim 12, wherein the movement related data includes acceleration data and the firmware further configures the motion controller to:

detect an acceleration of the storage device;
generate the acceleration data of the storage device;
transmit the acceleration data to the motion controller;
determine if the received acceleration data is greater than a maximum acceleration threshold; and
in response to the received acceleration data being greater than the maximum acceleration threshold, issue the park command that triggers the reading head of the storage device to enter the parked state.

15. The IHS of claim 12, wherein the firmware further configures the motion controller to:

calculate a change in velocity and a change in distance for the storage device from the received movement data;
determine a total velocity for the storage device;
determine if the total velocity is greater than a maximum total velocity threshold;
in response to the total velocity being greater than the maximum total velocity threshold, issue the park command that triggers the storage device to enter the parked state; and
save the movement data.

16. The information handling system of claim 12, wherein the firmware further configures the motion controller to:

accumulate total distance and velocity within a distance accumulator and a velocity accumulator;
determine if the storage device is at an end of travel position; and
in response to the storage device being at the end of travel position, clear the respective distance accumulator and velocity accumulator of an accumulated total travel distance and velocity.

* * * * *